United States Patent
Kiyama et al.

(10) Patent No.: US 12,191,982 B2
(45) Date of Patent: Jan. 7, 2025

(54) OPTICAL TRANSMISSION DEVICE

(71) Applicant: FUJITSU LIMITED, Kawasaki (JP)

(72) Inventors: Atsushi Kiyama, Kawasaki (JP);
Nobuyuki Fukuchi, Oyama (JP);
Tomoaki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 97 days.

(21) Appl. No.: 17/954,388

(22) Filed: Sep. 28, 2022

(65) Prior Publication Data

US 2023/0208548 A1  Jun. 29, 2023

(30) Foreign Application Priority Data

Dec. 27, 2021  (JP) .................................. 2021-212332

(51) Int. Cl.
*H04J 14/02* (2006.01)
*H04B 10/296* (2013.01)
*H04Q 11/00* (2006.01)

(52) U.S. Cl.
CPC ........ *H04J 14/0221* (2013.01); *H04B 10/296* (2013.01); *H04J 14/0212* (2013.01); *H04Q 11/0005* (2013.01); *H04Q 2011/0016* (2013.01)

(58) Field of Classification Search
CPC .......................... H04J 14/0201; H04J 14/0221
See application file for complete search history.

(56) References Cited

U.S. PATENT DOCUMENTS

| 2010/0239263 A1 | 9/2010 | Tokura et al. | |
| 2015/0117858 A1* | 4/2015 | Al Sayeed | H04B 10/07955 398/38 |
| 2016/0142152 A1* | 5/2016 | Murakami | H04J 14/0221 398/79 |
| 2022/0149938 A1* | 5/2022 | Pei | H04B 10/07951 |
| 2023/0030860 A1* | 2/2023 | Berg | H04B 10/07955 |

FOREIGN PATENT DOCUMENTS

| JP | 2018-157318 A | 10/2018 |
| WO | 2007/138649 A1 | 12/2007 |

OTHER PUBLICATIONS

Nakaji et al., "Superior high-speed automatic gain controlled erbium-doped fiber amplifiers", Optical Fiber Technology 9, Elsevier Science, 2003 (Year: 2003).*

* cited by examiner

*Primary Examiner* — Shi K Li
(74) *Attorney, Agent, or Firm* — Fujitsu Intellectual Property Center

(57) ABSTRACT

An optical transmission device includes: a selector configured to select a wavelength of a signal to be transmitted to an optical transmission line and output a wavelength-multiplexed signal; an adjustor configured to control a power level of the wavelength-multiplexed signal; and a controller configured to control the adjustor or the selector, wherein the selector selects a wavelength of an optical signal in a second wavelength band different from an existing first wavelength band, and when the second wavelength band is added to or removed from the optical transmission line, the controller controls power of the wavelength-multiplexed signal in the second wavelength band at a slower speed than power control in the first wavelength band.

8 Claims, 12 Drawing Sheets

FIG. 1
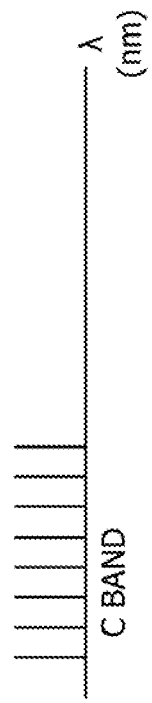
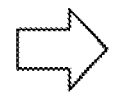
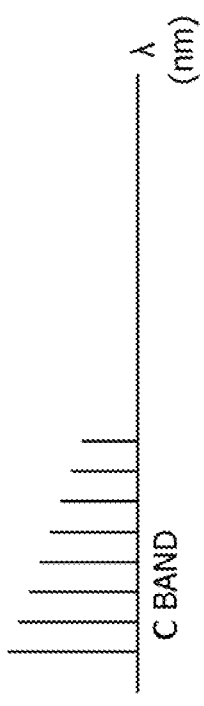
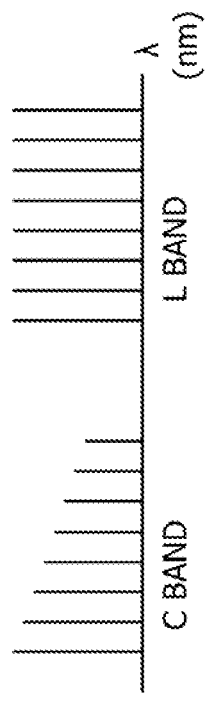

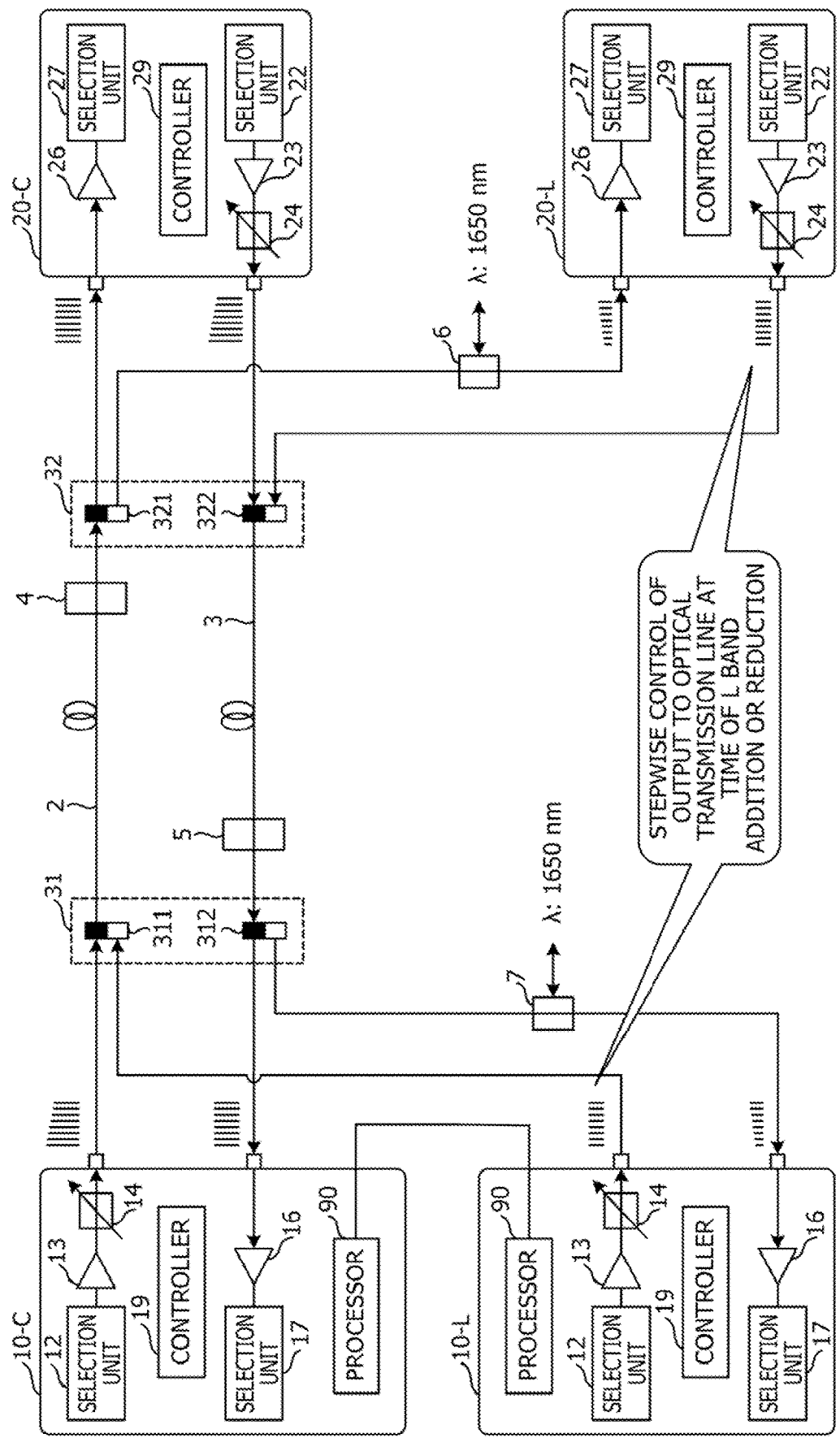

OPTICAL TRANSMISSION DEVICE

CROSS-REFERENCE TO RELATED APPLICATION

This application is based upon and claims the benefit of priority of the prior Japanese Patent Application No. 2021-212332, filed on Dec. 27, 2021, the entire contents of which are incorporated herein by reference.

FIELD

The present disclosure relates to an optical transmission device.

BACKGROUND

To carry out high-speed and large-capacity data communication, communication by a wavelength division multiplexing (WDM) communication method is performed in which a plurality of wavelength channels is multiplexed and transmitted on one optical fiber. To further expand the communication capacity, a multi-band optical transmission system has been being constructed, which uses a plurality of communication wavelength bands such as a long-wavelength band (L band) and a short-wavelength band (S band) in addition to a conventional band (C band) that is an existing communication wavelength band.

International Publication Pamphlet No. WO 2007/138649 is disclosed as related art.

SUMMARY

According to an aspect of the embodiments, an optical transmission device includes: a selector configured to select a wavelength of a signal to be transmitted to an optical transmission line and output a wavelength-multiplexed signal; an adjustor configured to control a power level of the wavelength-multiplexed signal; and a controller configured to control the adjustor or the selector, wherein the selector selects a wavelength of an optical signal in a second wavelength band different from an existing first wavelength band, and when the second wavelength band is added to or removed from the optical transmission line, the controller controls power of the wavelength-multiplexed signal in the second wavelength band at a slower speed than power control in the first wavelength band.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating technical problems caused by a configuration change of a communication wavelength band;

FIG. 2C is a diagram illustrating a modification of a network of FIG. 2B;

DESCRIPTION OF EMBODIMENTS

Figure 2A:
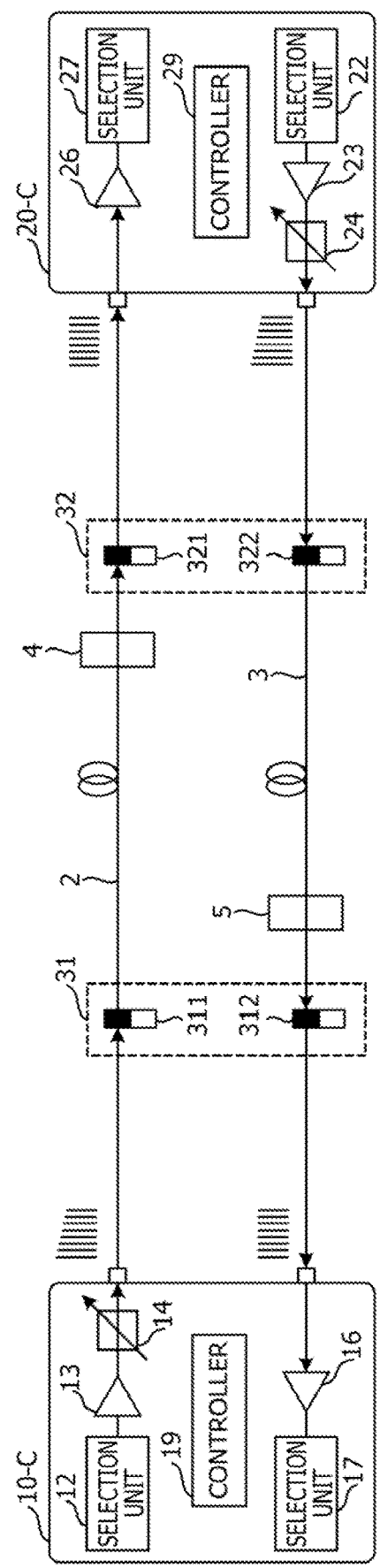
FIG. 2A is a schematic diagram illustrating a transmission state in a C band.

A WDM signal multiplexed and transmitted on the optical fiber is attenuated by a loss in an optical transmission line and an insertion loss. To compensate in advance for wavelength dependence regarding the loss in the optical transmission line and wavelength dependence regarding a gain of an optical amplifier, pre-emphasis is performed. In the pre-emphasis, the WDM signal transmitted to the optical transmission line is amplified on the short wavelength (high frequency) side according to attenuation characteristics of the optical transmission line. Even in the multi-band transmission, a pre-emphasis function on a transmission side can suppress a level decrease on a reception side to some extent.

When adding or removing a wavelength band during operation or when replacing optical transmission blades in a specific wavelength band in-service, the level on the short wavelength (high frequency) side of the WDM signal in other wavelength bands decreases or fluctuates. Even if the configuration of the communication wavelength band is changed in the multi-band transmission, it is desirable to suppress an influence on the other wavelength bands and to maintain transmission quality.

In one aspect, an object is to suppress the influence on the other wavelength bands to maintain the transmission quality even if the configuration of the communication wavelength band is changed in the multi-band transmission.

Before describing a configuration of an embodiment, technical problems caused by a configuration change of a communication wavelength band in multi-band transmission will be described in more detail with reference to FIG. 1. Consider a case where the configuration of a communication wavelength band is changed in the multi-band transmission, for example, a case where an L band is added to an optical transmission system that uses only a C band. The L band can be introduced to part or entire of an optical network when, for example, the number of channels in the C band increases and the band in the C band is filled.

In the optical transmission in the C band, a WDM signal is amplified on a short wavelength side by pre-emphasis on a transmission side and transmitted to an optical transmission line. Since a high frequency (short wavelength) component, which is attenuated in the optical transmission line, is reinforced in advance, a level decrease on the short wavelength side is suppressed on a reception side.

When the L band is added during a state where the pre-emphasis in the C band is functioning, a signal level on the short wavelength side of the C band decreases. An L-band WDM signal including a large number of channels is sent to the optical transmission line at the same time with rise of the L band, and induced Raman scattering occurs in an optical fiber. The L-band signal light of a lower frequency is amplified by energy of the C-band signal light due to the nonlinear optical effect, and the level of the C-band signal light decreases.

In a case of removing the L band from the optical transmission state in which the C band and the L band are used together, or even in a case of replacing an optical transmission blade in one wavelength band (for example, the L band), the level of the WDM signal decreases or fluctuates in the other wavelength band (for example, the C band), causing a similar problem.

The following reasons are considered for the decrease in the signal level in the other wavelength band at the time of addition or reduction of a wavelength band or at the time of in-service maintenance or replacement. It is considered that the optical transmission line changes suddenly due to injection or removal of the signal light in one wavelength band, and power control of the WDM signal in the other wavelength band is not able to catch up with the sudden change.

In the embodiment, when the configuration of the communication wavelength band is changed, control of the signal light in a first wavelength band to be changed is performed more slowly than control of the signal light in an unchanged second wavelength band. For example,
  (a) a power level of the first wavelength band to be changed is controlled gradually or stepwise while waiting for convergence of power adjustment of the unchanged second wavelength band. Alternatively,
  (b) a time constant of the control of the first wavelength band to be changed is set to be larger than a time constant of the control of the unchanged second wavelength band.

In general, pre-emphasis control has no coordination between different wavelength bands. In the case of performing stepwise control as in (a) above, a processor shared between optical transmission devices that handle the different wavelength bands is used or a control processor that collectively controls the plurality of optical transmission devices that handle the different wavelength bands is used. In the case of performing autonomous control as in (b) above, the time constant of power adjustment at the time of addition or reduction is set for a processor of the optical transmission device of an individual wavelength band, and each optical transmission device performs the power adjustment according to the time constant.

Hereinafter, the optical transmission device and its control configuration of the embodiment will be specifically described. The following description is intended to embody the technical ideas of the present disclosure and is not intended to limit the present disclosure to the following description unless otherwise noted. Hereinafter, the same configuration elements may be denoted by the same reference signs and redundant description may be omitted.

Figure 2B:
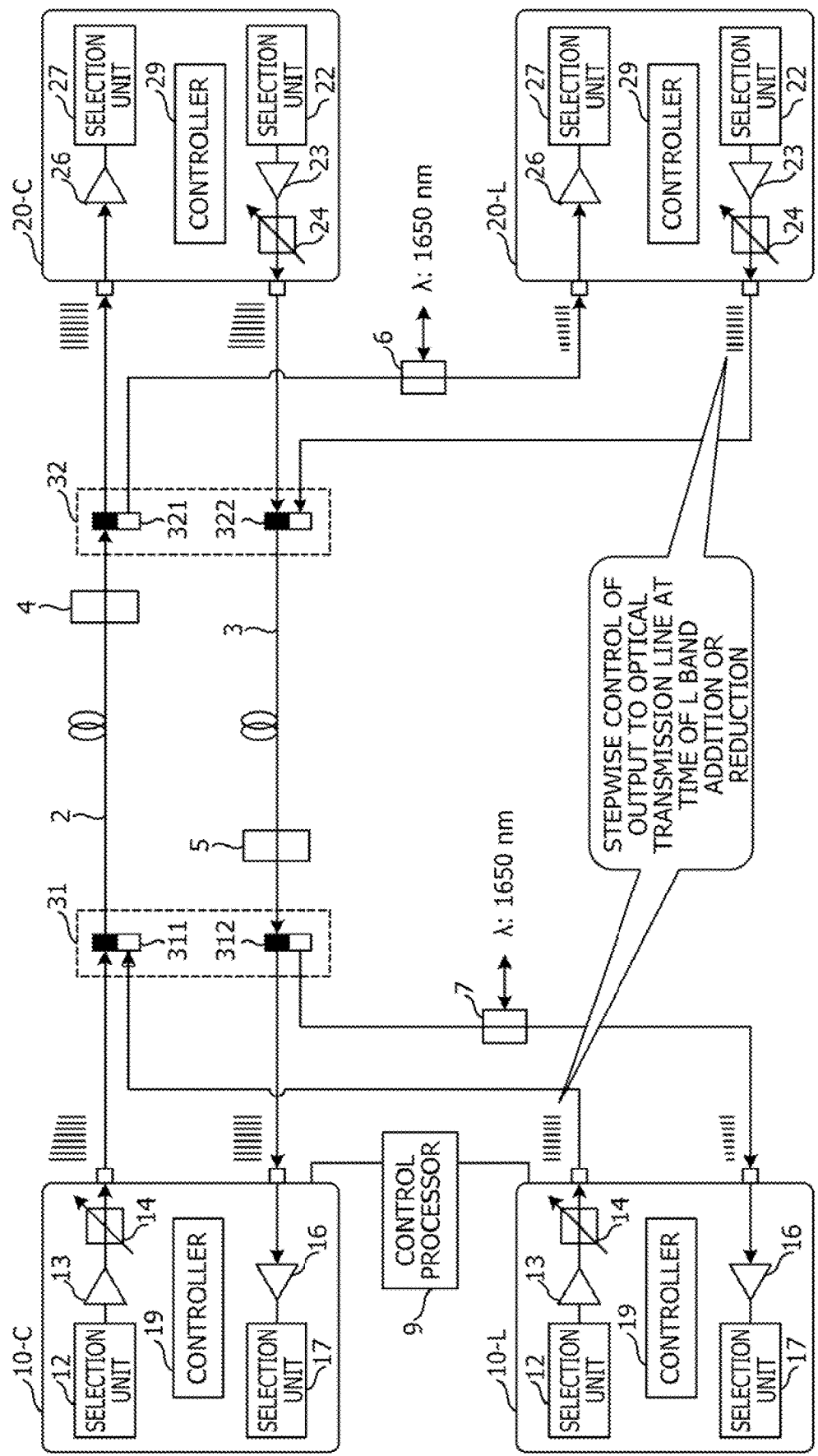
FIG. 2B is a schematic diagram illustrating a transmission state in the C band and an L band.

FIG. 2A is a schematic diagram illustrating a transmission state in the C band in an optical network 1 of the embodiment. FIG. 2B is a schematic diagram illustrating a transmission state using the C band and the L band. In FIG. 2A, optical transmission devices 10-C and 20-C that handle WDM signals in the C band are connected to each other via optical transmission lines 2 and 3.

The optical transmission devices 10-C and 20-C are, for example, reconfigurable optical add-drop multiplexers (ROADM) nodes adjacent to each other in the optical network 1. The optical transmission device 10-C adds (inserts) or drops (branches) a client-side signal to or from the WDM signal received from another route, selects a signal wavelength to be sent in a direction of the optical transmission device 20-C, and transmits the C-band WDM signal to the optical transmission line 2. Furthermore, the optical transmission device 10-C adds or drops the client-side signal to or from the WDM signal received from the optical transmission line 3, selects a signal wavelength for each route, and transmits the C-band WDM signal to another route.

The optical transmission device 20-C adds (inserts) or drops (branches) the client-side signal to or from the WDM signal received from the optical transmission line 2, selects a signal wavelength for each route, and transmits the C-band WDM signal to another route. Furthermore, the optical transmission device 20-C adds (inserts) or drops (branches) a client-side signal to or from the WDM signal received from another route, selects a signal wavelength to be sent in the direction of the optical transmission device 10-C, and transmits the C-band WDM signal to the optical transmission line 3.

The C-band WDM signal transmitted from the optical transmission device 10-C to the optical transmission line 2 is amplified on the short wavelength side by the pre-emphasis function of the optical transmission device 10-C. The pre-emphasized C-band WDM signal is received by the optical transmission device 20-C in a state where the decrease in signal level is suppressed. Similarly, the C-band WDM signal transmitted from the optical transmission device 20-C to the optical transmission line 3 is amplified on the short wavelength side by the pre-emphasis function of the optical transmission device 20-C. The pre-emphasized WDM signal is received by the optical transmission device 10-C in a state where the decrease in signal level is suppressed.

Optical couplers 31 and 32 that multiplex and demultiplex the C-band signal and the L-band signal are inserted in the optical transmission lines 2 and 3 in anticipation of future addition of the L band. The optical coupler 31 includes C/L couplers 311 and 312. The optical coupler 32 includes C/L couplers 321 and 322. Furthermore, to amplify the signal attenuated in the middle of optical transmission, Raman amplifiers 4 and 5 are inserted in the optical transmission lines 2 and 3, respectively.

The optical transmission device 10-C has a selection unit 12, an optical amplifier 13, and a variable optical attenuator (VOA) 14 on the transmission side to the optical transmission line 2. The selection unit 12 has a wavelength selective switch as to be described below, and performs the pre-emphasis that is level control in units of wavelength with the wavelength selective switch. Since the optical amplifier 13 is provided at a subsequent stage of the selection unit 12, the optical amplifier 13 may be called "post-amplifier". The VOA 14 collectively attenuates and controls the C-band WDM signals. The VOA 14 attenuates total power in order to keep a span loss between the optical transmission devices 10-C and 20-C constant or in a case where the span loss is small and input power of the optical transmission device on an opposite side becomes too large. Both the selection unit 12 and the VOA 14 are used as "adjustors" for adjusting the power level of the WDM signal. The optical transmission device 10-C has an optical amplifier 16 and a selection unit 17 on the reception side from the optical transmission line 3. Since the optical amplifier 16 is provided at a preceding stage of the selection unit 17, the optical amplifier 16 may be called "preamplifier". The optical transmission device 10-C has a controller 19 that controls the entire operation of the optical transmission device 10-C.

The optical transmission device 20-C has a selection unit 22, an optical amplifier 23, and a VOA 24 on the transmission side to the optical transmission line 3. The optical transmission device 20-C has an optical amplifier 26 and a selection unit 27 on the reception side from the optical transmission line 2. The optical amplifier 23 may be referred to as a "post-amplifier" and the optical amplifier 16 may be referred to as a "preamplifier". The optical transmission device 20-C has a controller 29 that controls the entire operation of the optical transmission device 20-C. The operations of the selection unit 22 and VOA 24 are the same as the operations of the selection unit 12 and VOA 14, respectively.

In FIG. 2B, the band of the C band is filled and the L band is added. When the L band is added, optical transmission devices 10-L and 20-L that handle the L-band WDM signal are connected to the optical network 1 by the optical couplers 31 and 32, respectively. For example, a connection state with the optical transmission line 3 is tested at a test position 7 between the optical transmission device 10-L and the C/L coupler 312, and a connection state with the optical transmission line 2 is tested at a test position 6 between the optical transmission device 20-L and the C/L coupler 321. In the connection test, an optical pulse of a wavelength of 1650 nm is incident on an optical fiber using a tester such as an optical time domain reflectometer (OTDR), and connection loss and reflection are evaluated.

When the connection of the optical fiber is completed in both directions, the optical transmission devices 10-L and 20-L start output control to the optical transmission lines 2 and 3. Hereinafter, description will be given focusing on the control on the transmission side on the optical transmission device 10-L to the optical transmission line 2, but similar control is performed on the transmission side of the optical transmission device 20-L to the optical transmission line 3. The optical transmission device 10-L slowly controls the power of the L-band WDM signal to be output to the optical transmission line 2 via the C/L coupler 311 than the power control of the C-band WDM signal by the optical transmission device 10-C.

In FIG. 2B, the optical transmission device 10-C and the optical transmission device 10-L are connected to a control processor 9, but the control processor 9 is not indispensable, and the controller 19 of the optical transmission device 10-L may autonomously perform the power control. As illustrated in FIG. 2C, it may be configured to provide a processor 90 in each of the optical transmission devices 10-C and 10-L in an optical network 1A, and cause the processors 90 to communicate with each other. Other configurations of the optical network 1A are the same as those of the optical network 1 in FIG. 2B. Alternatively, the controller 19 of the optical transmission device 10-C may be used as a controller shared with the optical transmission device 10-L. The same similarly applies to the arrangement relationship between the optical transmission devices 20-C and 20-L.

When the control processor 9 is used, the optical transmission device 10-L sets initial power of the L-band WDM signal to be lower than a target power level and outputs the L-band WDM signal to the optical transmission line 2. Since the low power L-band WDM signal is transmitted to the optical transmission line 2, the level of the C-band WDM signal received by the optical transmission device 20-C somewhat decreases or fluctuates. The optical transmission device 10-C recovers the signal level of the C-band WDM signal, using the pre-emphasis function.

When the state of the C-band WDM signal becomes stable, the control processor 9 notifies the optical transmission device 10-L of control convergence of the C-band WDM signal. When having received notification of the control convergence of the C band, the optical transmission device 10-L increases the power of the L-band WDM signal by a predetermined level and transmits the L-band WDM signal to the optical transmission line 2, and wait for the notification of the control convergence of the C-band WDM signal. By repeating this process, the output power of the L-band WDM signal is increased gradually or stepwise to suppress an influence on the C-band WDM signal.

In the case where the optical transmission device 10-L autonomously controls the power without using the control processor 9, the time constant of the power control of the optical transmission device 10-L at the time of L band addition is set to be larger than the time constant of the power control of the optical transmission device 10-C. The optical transmission device 10-L sets the initial power of the WDM signal to be lower than the target transmission power, and outputs the L-band WDM signal to the optical transmission line 2. Thereafter, the optical transmission device 10-L stands by for a predetermined time determined by the time constant, and increases the power of the L-band WDM signal by a predetermined level after a lapse of the predetermined time. During this standby time, the optical transmission device 10-C recovers the decrease or fluctuation of the C-band WDM signal by the pre-emphasis function.

At the time of L band addition, sudden incident of the L-band WDM signal on the optical transmission lines 2 and 3 is suppressed, and the power level of the L-band WDM signal is slowly raised according to a recovery state of the C-band WDM signal. Thereby, adverse effects on the C-band WDM signal during operation can be suppressed. When the control at the time of L band addition is completed and the optical transmission in the C band and the L band is stabilized, the time constant may be canceled. Thereafter, the L-band optical transmission device 10-L performs the pre-emphasis control at a normal control speed.

In the case of removing the L-band optical transmission device for reduction or for maintenance or replacement of the L band, the state in FIG. 2B transitions to the state in FIG. 2A. The level of the L-band WDM signal is gradually lowered while observing the state of the C-band WDM signal, instead of suddenly disconnecting the L-band optical transmission devices 10-L and 20-L from the optical transmission lines 2 and 3. When the C-band WDM signal is stabilized, the L-band optical transmission devices 10-L and 20-L are separated from the optical transmission lines 2 and 3. Thereby, deterioration of the C-band WDM signal can be suppressed at the time of L band reduction. At the time of maintenance or replacement of the optical transmission device 10-L or 20-L, similar control to that at the time of reduction or addition of the L band is performed.

Figure 3:
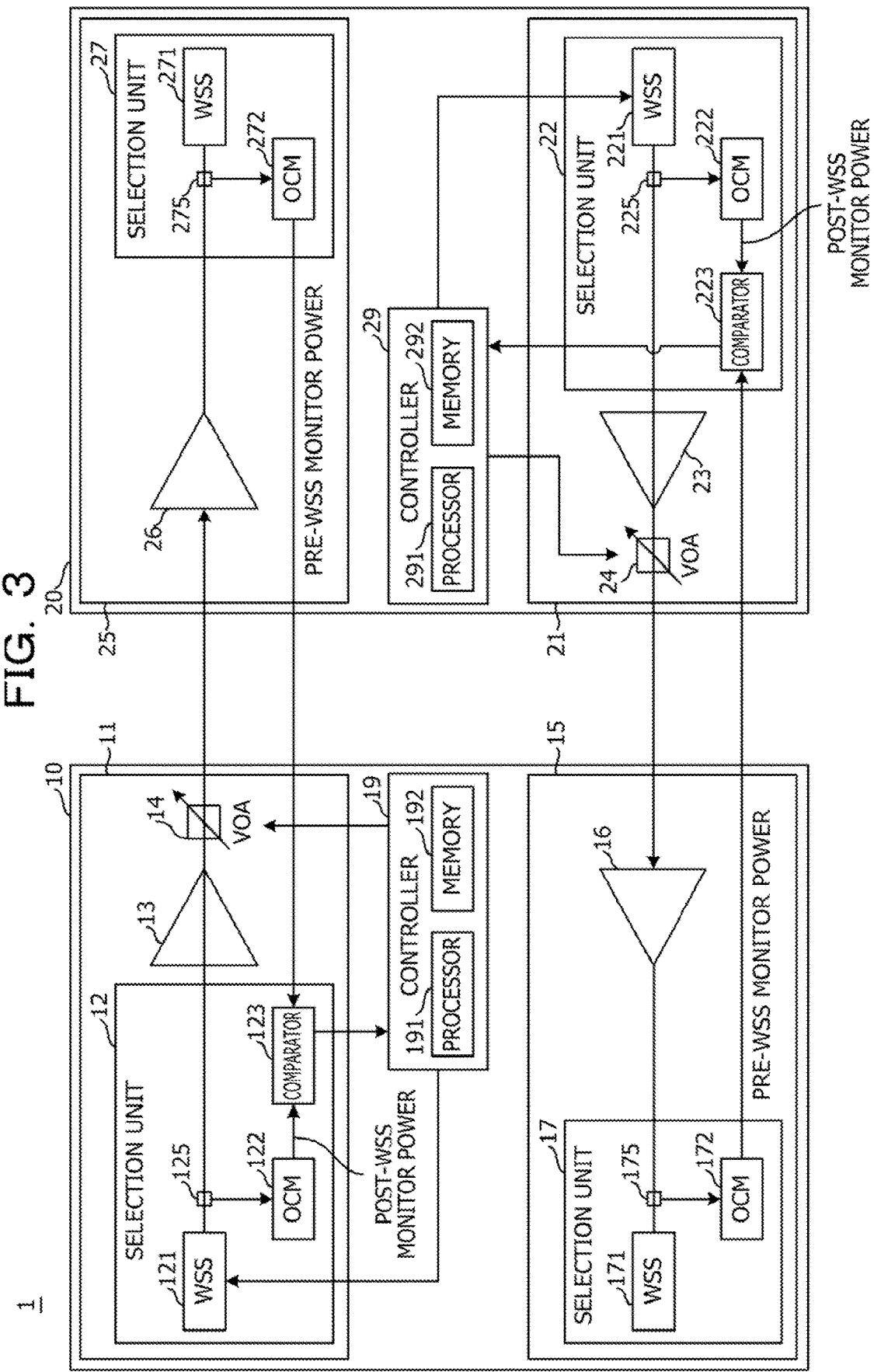
FIG. 3 is a schematic diagram of optical transmission devices according to an embodiment.

FIG. 3 is a schematic diagram of the optical transmission devices 10 and 20 according to the embodiment. The optical transmission device 10 includes a transmission circuit 11 to the optical transmission line 2, a reception circuit 15 from the optical transmission line 3, and the controller 19. The transmission circuit 11 includes the selection unit 12, the optical amplifier 13, and the VOA 14, as described above. The selection unit 12 includes a wavelength selective switch (WSS) 121, an optical channel monitor (OCM) 122, a comparator 123, and a coupler 125. The reception circuit 15 has the optical amplifier 16 and the selection unit 17. The selection unit 17 has a WSS 171, an OCM 172, and a coupler 175.

The optical transmission device 20 includes a transmission circuit 21 to the optical transmission line 3, a reception circuit 25 from the optical transmission line 2, and the controller 29. The transmission circuit 21 includes the selection unit 22, the optical amplifier 23, and the VOA 24. The selection unit 22 has a WSS 221, an OCM 222, a comparator 223, and a coupler 225. The selection unit 27 of the reception circuit 25 has a WSS 271, an OCM 272, and a coupler 275.

A portion of the optical transmission device 10 connected to the optical transmission line on the opposite side of the optical transmission lines 2 and 3 may have the same configuration as the optical transmission device 20. A portion of the optical transmission device 20 connected to the optical transmission line on the opposite side of the optical transmission lines 2 and 3 may have the same configuration as the optical transmission device 10.

The WSS 121 of the transmission circuit 11 selects the wavelength of the optical signal to be transmitted in the direction of the optical transmission device 20 from among the optical signals from other directions and the optical signals to be added, multiplexes the optical signal of the selected wavelength, and outputs the WDM signal to the route of the optical transmission line 2. At each channel (wavelength) of the WDM signal output from the WSS 121, a part of the signal light is branched by the coupler 125 and guided to the OCM 122. The OCM 122 monitors the power of the optical signal for each channel and inputs a monitoring result to the comparator 123. The WDM signal other than the branched optical component is amplified by the optical amplifier 13, an optical attenuation amount is adjusted by the VOA 14, and the WDM signal is output to the optical transmission line 2.

The WDM signal incident on the reception circuit 25 of the optical transmission device 20 from the optical transmission line 2 is amplified by the optical amplifier 26. A part of the amplified WDM signal is branched by the coupler 275, and the optical power is monitored for each channel by the OCM 272. The monitoring result is sent to the optical transmission device 10 through the optical transmission line 3 and input to the comparator 123. For the WDM signal other than the branched signal component, the signal of the wavelength to be dropped is selected by the WSS 271 of the selection unit 27, and the rest is sent to the WSS in the subsequent stage.

The comparator 123 of the optical transmission device 10 compares post-WSS monitor power monitored in the subsequent stage of the WSS 121 with pre-WSS monitor power monitored in the preceding stage of the reception-side WSS 271 of the optical transmission device 20 for each channel, and inputs a comparison result to the controller 19. The controller 19 has a processor 191 and a memory 192. The processor 191 controls one or both of the WSS 121 and the VOA 14 on the basis of the comparison result of the comparator 123 and control information stored in the memory 192. The adjustment of the power level for each channel by the WSS 121 or the attenuation amount of the VOA 14 is calculated so as to compensate for attenuation characteristics of the optical transmission line 2.

The transmission circuit 21 of the optical transmission device 20 and the reception circuit 15 of the optical transmission device 10 operate in the same manner as the transmission circuit 11 of the optical transmission device 10 and the reception circuit 25 of the optical transmission device 20. The power of the WDM signal to be output to the optical transmission line 3 is monitored for each channel by the OCM 222 of the transmission circuit 21 of the optical transmission device 20. The power of the WDM signal received by the optical transmission device 10 is monitored for each channel by the OCM 172 of the reception circuit 15, and the monitoring result is notified to the optical transmission device 20 through the optical transmission line 2. The comparator 223 of the optical transmission device 20 compares the power on the transmission side with the monitoring result fed back from the optical transmission device 10 for each channel, and inputs the comparison result to the controller 29. The controller 29 has a processor 291 and a memory 292, and controls one or both of the WSS 221 and the VOA 24 on the basis of the comparison result and information in the memory 292.

In the case where the optical transmission devices 10 and 20 handle the C-band WDM signal, the power of the C-band WDM signal is controlled by the pre-emphasis function regardless of the presence or absence of addition or reduction of other wavelength bands. In the case where the optical transmission devices 10 and 20 handle WDM signals in other wavelength bands (for example, the L band), the power of the L-band WDM signal is controlled at a speed slower than the pre-emphasis control for the C-band WDM signal when the optical transmission devices 10 and 20 are connected to or disconnected from the optical network 1.

Figure 4A:
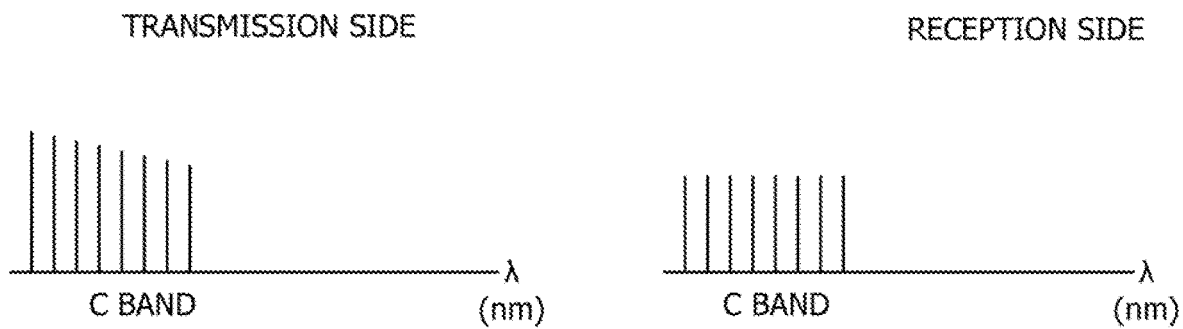
FIGS. 4A to 4D are schematic diagrams of control of the optical transmission device at the time of L band addition.

FIGS. 4A to 4D are schematic diagrams of control of the optical transmission device at the time of L band addition. In FIG. 4A, the optical transmission is performed only in the C band. The transmission-side C-band WDM signal is amplified on the short wavelength (high frequency) side by pre-emphasis. Thereby, a flat frequency response can be obtained in the wavelength band of the C band on the reception side.

Figure 4B:
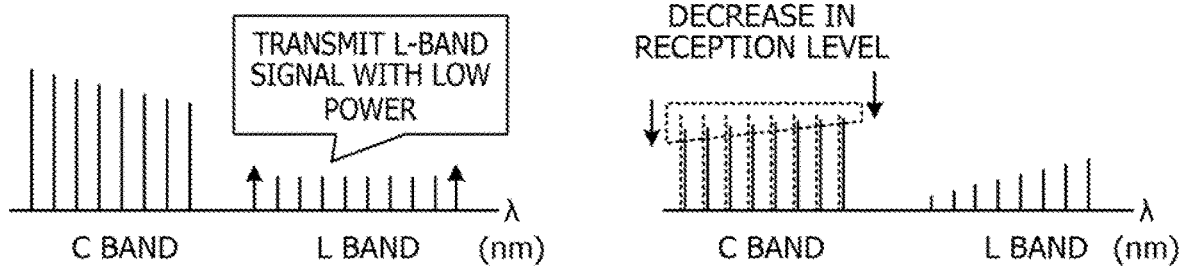

In FIG. 4B, the L band with a longer wavelength than the C band is added. The L-band optical transmission device 10-L (see FIG. 2B) releases the VOA 14 and transmits the L-band WDM signal at power lower than the target power level. The incident of the L-band WDM signal on the optical transmission line 2 may cause nonlinear optical effects such as induced Raman scattering in the optical transmission line 2, and light reception power of the C-band WDM signal slightly decreases from the state (A).

Figure 4C:
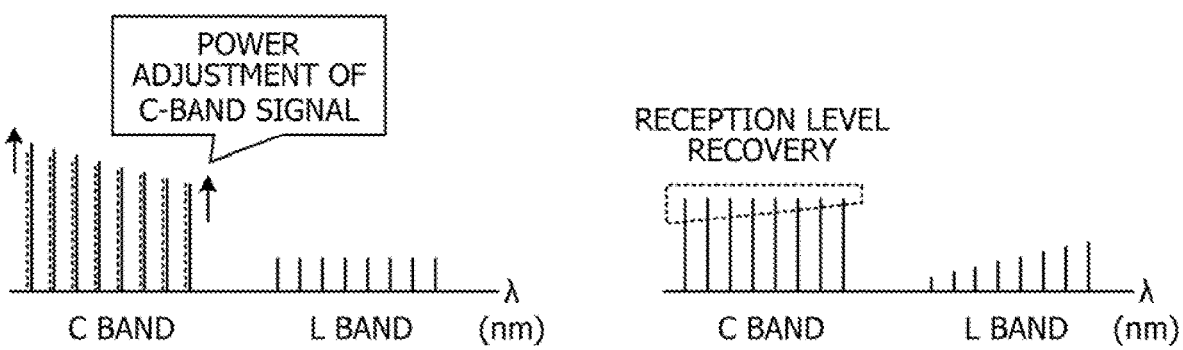

In FIG. 4C, the C-band optical transmission device 10-C (see FIG. 2B) controls the VOA 14 or the WSS 121 to adjust the level of the C-band WDM signal so as to absorb the influence of the incident of the L-band WDM signal. Thereby, the reception level of the C-band WDM signal is recovered on the reception side.

Figure 4D:
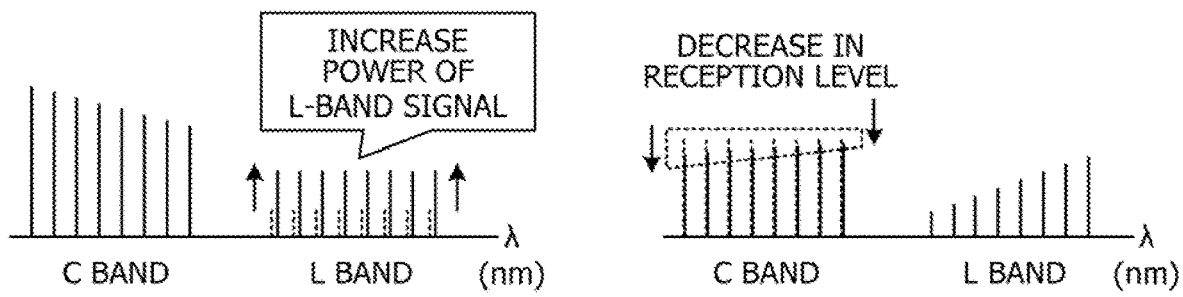

In FIG. 4D, the L-band optical transmission device 10-L releases the VOA 14, increases the power of the L-band WDM signal by a predetermined level, and transmits the L-band WDM signal. Due to the induced Raman scattering in the optical transmission line 2, the energy of the C-band WDM signal decreases on the reception side, and the reception power slightly decreases from the state (C). (C) and (D) are repeated until the power of the C-band WDM signal is stabilized and the L-band WDM signal reaches the target power level.

By controlling the L-band VOA 14 slower than the C-band pre-emphasis control, the sudden change in the level of the C-band WDM signal due to the incident of the L-band WDM signal is suppressed. For example, the power of the L-band WDM signal is gradually increased after waiting for convergence of the power control of the C-band WDM signal. Thereby, in-service L-band addition is implemented.

Figure 5:
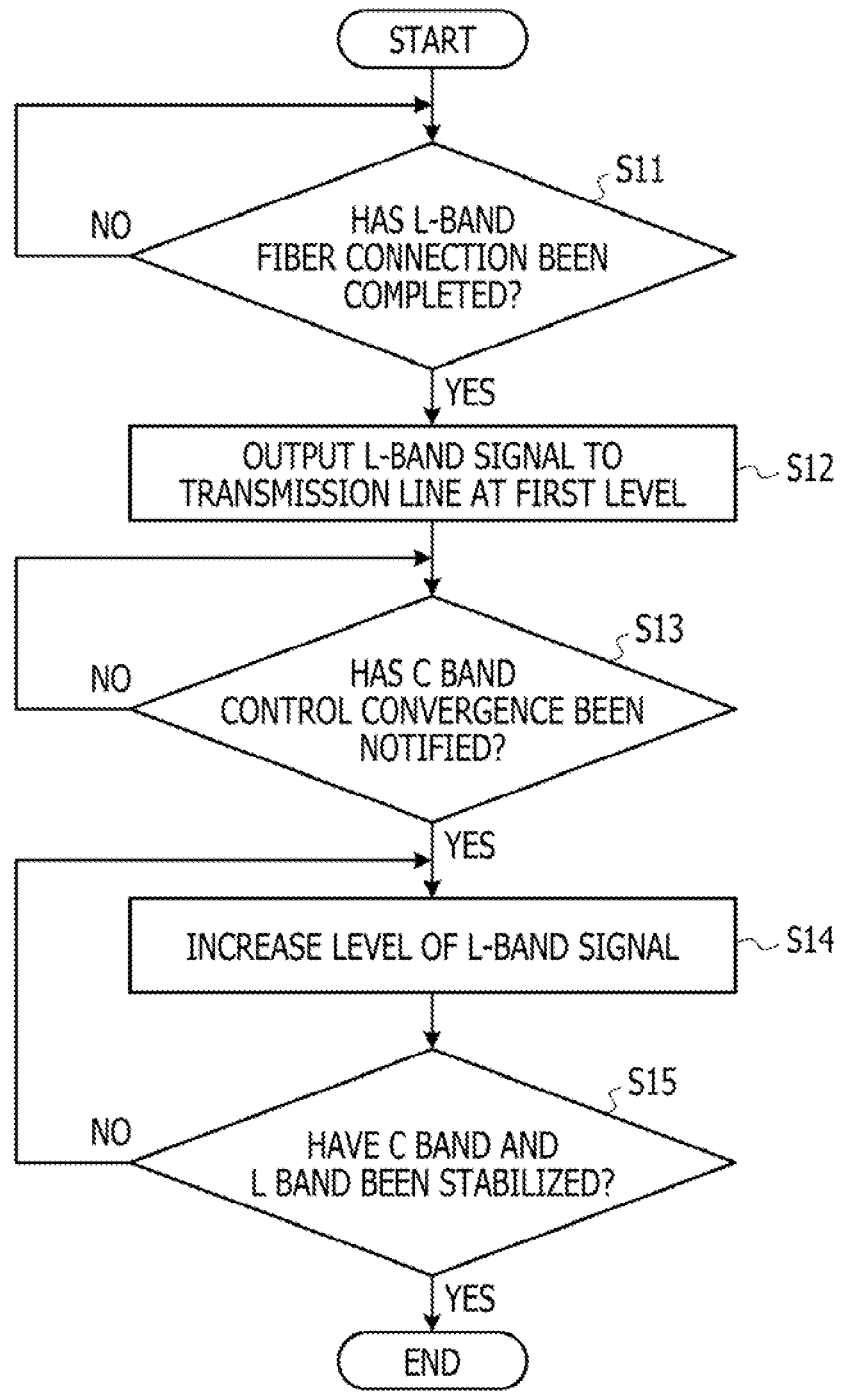
FIG. 5 is a flowchart of the control at the time of L band addition in a case of using a control processor.

FIG. 5 is a flowchart of the control at the time of L band addition in the case of using the control processor 9 as in FIG. 2B. Consider a case where the L band is added to an optical transmission section operating in the C band. When connection of the L-band optical fiber is completed (YES in S11), the controller 19 of the L-band optical transmission device 10-L controls the VOA 14 and transmits the L-band WDM signal to the optical transmission line 2 at a first level lower than the target power level (S12).

By transmitting the L-band WDM signal to the optical transmission line 2, the level of the C-band WDM signal decreases. The C-band optical transmission device 10-C controls at least one of the WSS 121 or the VOA 14 to adjust the C-band WDM signal level to be sent to the optical transmission line 2. When the reception level of the C-band WDM signal is recovered on the reception side, the control processor 9 notifies the optical transmission device 10-L of the control convergence of the C-band. When having received notification of the control convergence of the C band (YES in S13), the controller 19 of the optical transmission device 10-L increases the power of the L-band WDM signal by a predetermined level and transmits the L-band WDM signal to the optical transmission line 2 (S14).

The C-band optical transmission device 10-C adjusts the power to recover the decrease in level of the C-band WDM signal on the reception side due to the transmission of the L-band WDM signal. The controller of the optical transmission device 10-L repeats S14 and S15 until the output power of the L band reaches the target level and the reception power of both the C band and the L band is stabilized (YES in S15) on the basis of the notification of the control convergence from the control processor 9. When the reception power in the C band and the L band is stabilized at the target level, the control at the time of L band addition ends. Thereafter, the optical transmission is performed using the C band and the L band, and pre-emphasis control is performed in each of the C band and the L band.

Figure 6:
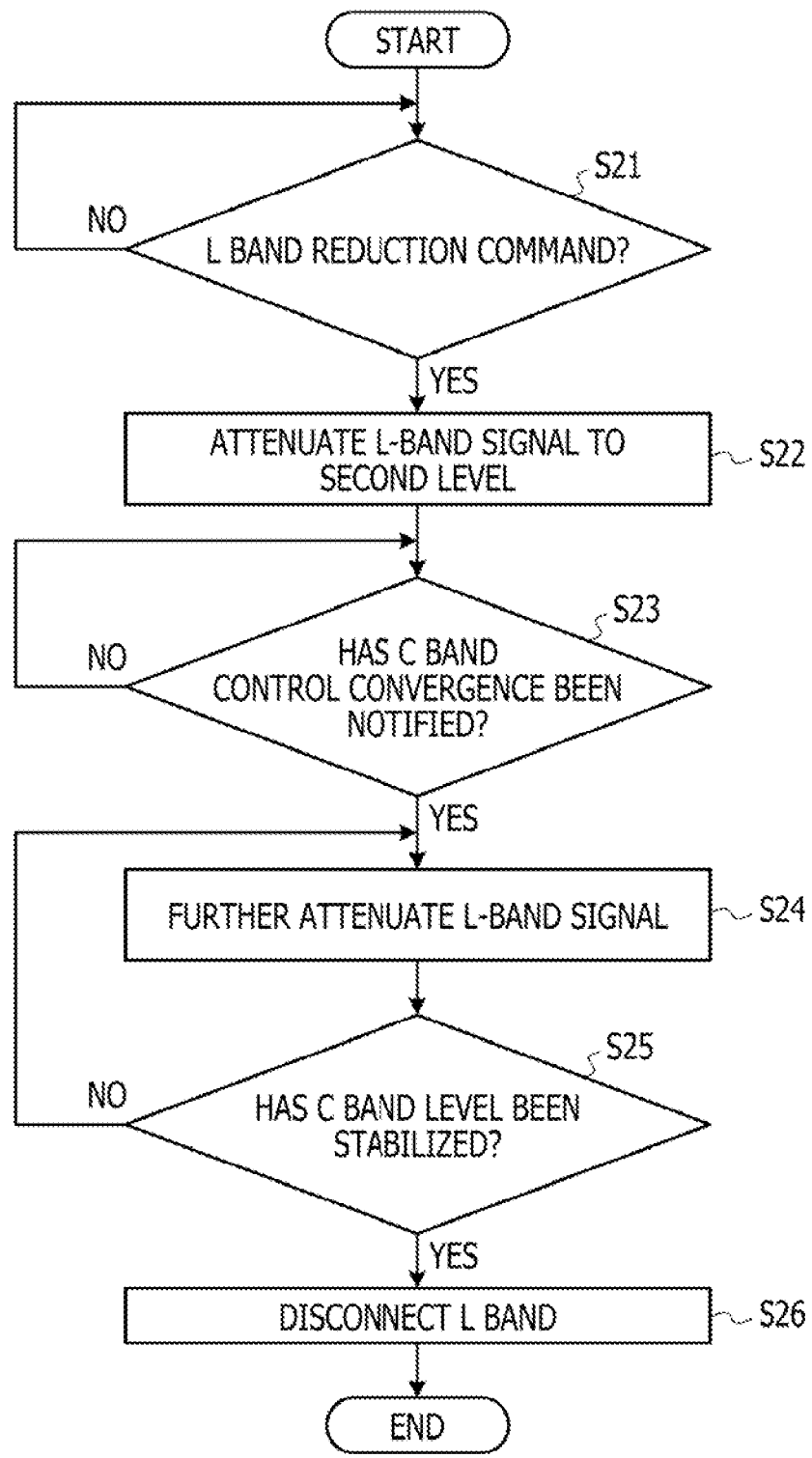
FIG. 6 is a flowchart of the control at the time of L band reduction in a case of using the control processor.

FIG. 6 is a flowchart of the control at the time of L band reduction in the case of using the control processor 9 as in FIG. 2B. Consider a case where the L band is removed from the optical transmission section in which the C band and the L band are used together. When having received an instruction of L band reduction (YES in S21), the controller 19 of the optical transmission device 10-L reduces the L-band WDM signal to a second level lower than the current transmission level (S22). The instruction to L band reduction may be manually input to the optical transmission device 10-L or the control processor 9 by an operator, or may be transmitted from a network management device that manages the optical network 1 to the control processor 9 or the optical transmission device 10-L in a management transmission line.

The C-band WDM signal fluctuates due to the decrease in power of the L-band WDM signal, and the fluctuation of the C-band WDM signal is adjusted by the pre-emphasis function of the optical transmission device 10-C. When having received the notification of the control convergence of the C band from the control processor 9 (YES in S23), the controller 19 of the optical transmission device 10-L further reduces the power of the L-band WDM signal and transmits the L-band WDM signal to the optical transmission line 2 (S24). The optical transmission device 10-L repeats S24 and S25 until the reception power in the C band is stabilized (YES in S25) on the basis of the notification of the control convergence from the control processor 9. When the reception power in the C band is stabilized, the optical transmission of the L band is disconnected (S26), and the control at the time of reduction ends.

Figure 7:
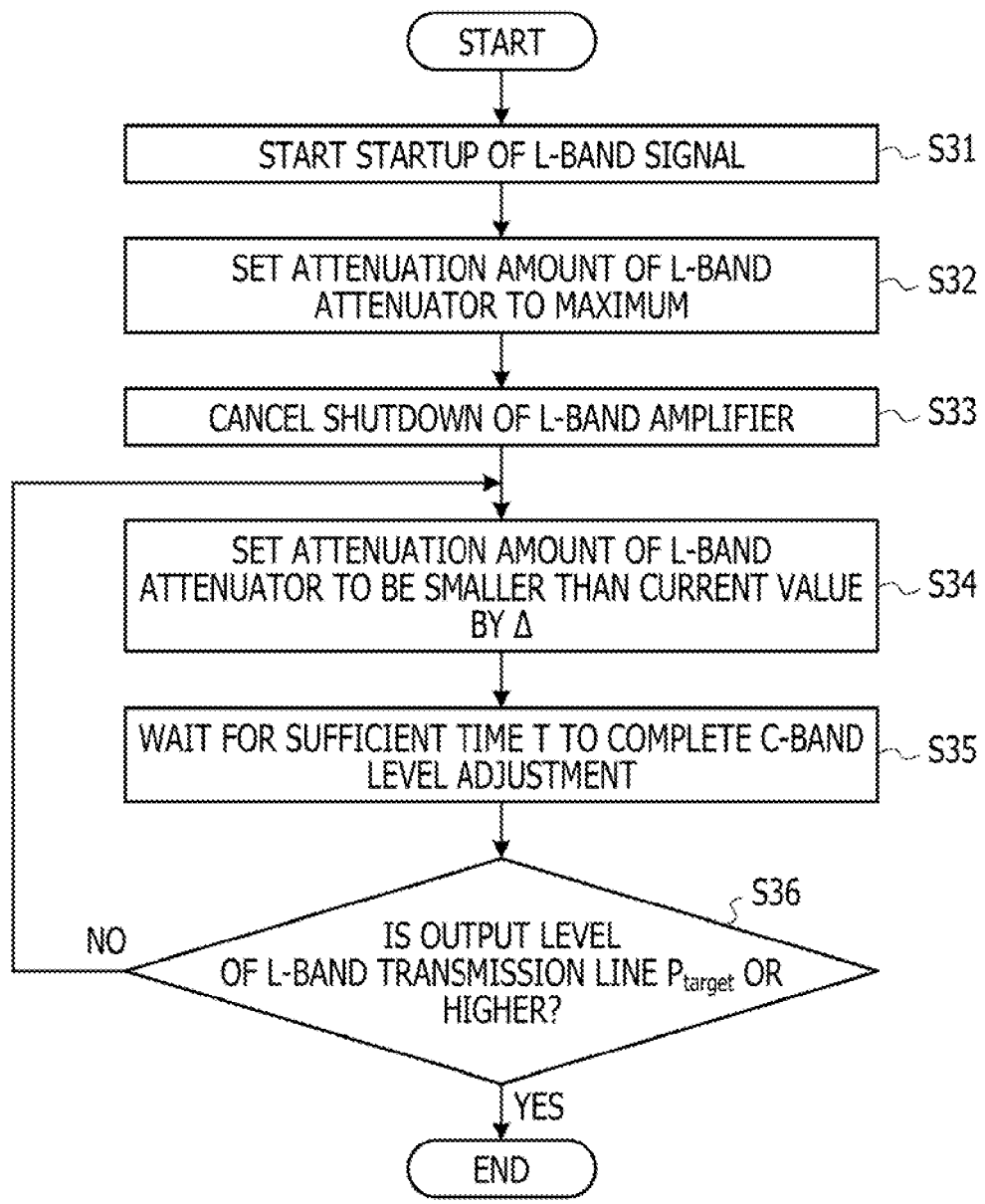
FIG. 7 is a flowchart of autonomous control at the time of L band addition.

FIG. 7 is a flowchart of autonomous control of the optical transmission device 10-L at the time of L band addition. When having received an L-band startup instruction from the operator or the network management device, the controller 19 of the optical transmission device 10-L starts up the L-band signal (S31). First, the attenuation amount of the VOA 14 of the optical transmission device 10-L is set to maximum (S32). Next, shutdown of the optical amplifier 13 is canceled (S33), and the attenuation amount of the VOA 14 is set to be smaller than a current value by A (S34). Thereby, the L-band WDM signal is output to the optical transmission line 2 with minimum power.

Next, the controller 19 waits for a sufficient time T to complete the level adjustment of the C-band WDM signal (S35). The time T may be set by the time constant determined from a past transmission status of the C band. After a lapse of the time T, the controller 19 determines whether the output level of the L-band WDM signal to the optical transmission line 2 is equal to or higher than a target power level Ptarget (S36). In a case where the output level has not reached the target power level Ptarget (NO in S36), the controller 19 returns to S34, further reduces the attenuation amount of the VOA 14, and waits for the predetermined time T (S35). The controller 19 repeats S34 and S35 until the L-band WDM signal reaches the target power level Ptarget, and terminates the processing at the time of L band addition when the L-band WDM signal has reached the power level Ptarget (YES in S36).

Figure 8:
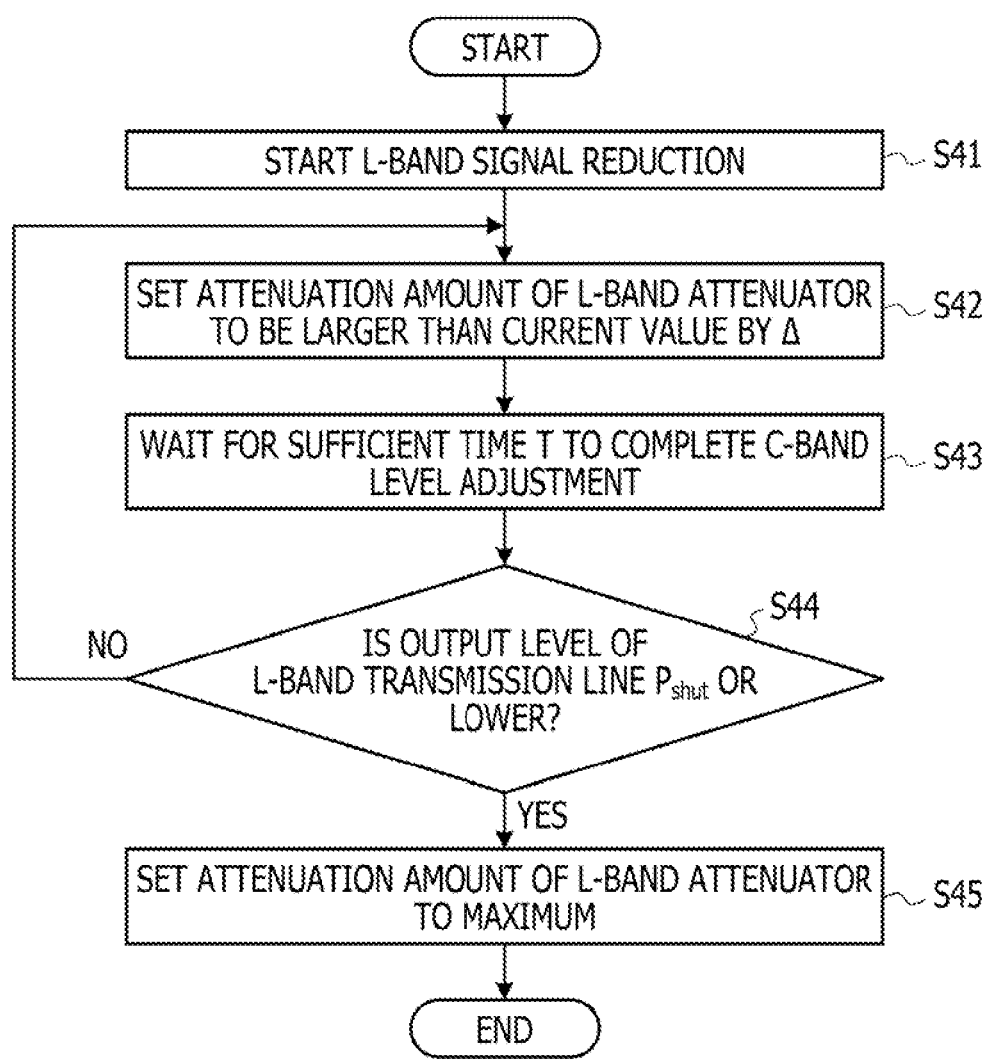
FIG. 8 is a flowchart of autonomous control at the time of L band reduction.

FIG. 8 is a flowchart of autonomous control of the optical transmission device 10-L at the time of L band reduction. When the controller 19 of the optical transmission device 10-L receives the instruction of the L band reduction from the operator or the network management device, the controller 19 starts the processing of the L band reduction (S41). The attenuation amount of the VOA 14 of the optical transmission device 10-L is set to be larger than the current value by A (S42). Thereby, the L-band WDM signal is output to the optical transmission line 2 with reduced power.

Next, the controller 19 waits for the time T that is sufficient to complete the level adjustment of the C-band WDM signal (S43), and determines whether the power level of the L-band WDM signal is equal to or lower than a shutdown level Pshut (S44). In a case where the power level has not reached the shutdown level Pshut (NO in S44), the controller 19 return to S42 and further increases the attenuation amount of the VOA 14, and wait for the predetermined time T (S43). The controller 19 repeats S43 and S44 until the L-band WDM signal decreases to the shutdown level Pshut. When the output power of the L-band WDM signal has reached the shutdown level Pshut (YES in S44), the controller 19 sets the attenuation amount of the VOA 14 to the maximum (S45) and terminates the processing at the time of L band reduction.

In FIGS. 5 to 8, the power of the L-band WDM signal is controlled by controlling the attenuation amount of the VOA 14 of the optical transmission device 10-L for each channel at the time of addition or reduction, or maintenance or replacement, of the L band. Instead of controlling the attenuation amount of the VOA 14, the power may be adjusted by controlling a device such as a WSS capable of adjusting intensity for each channel.

Figure 9:
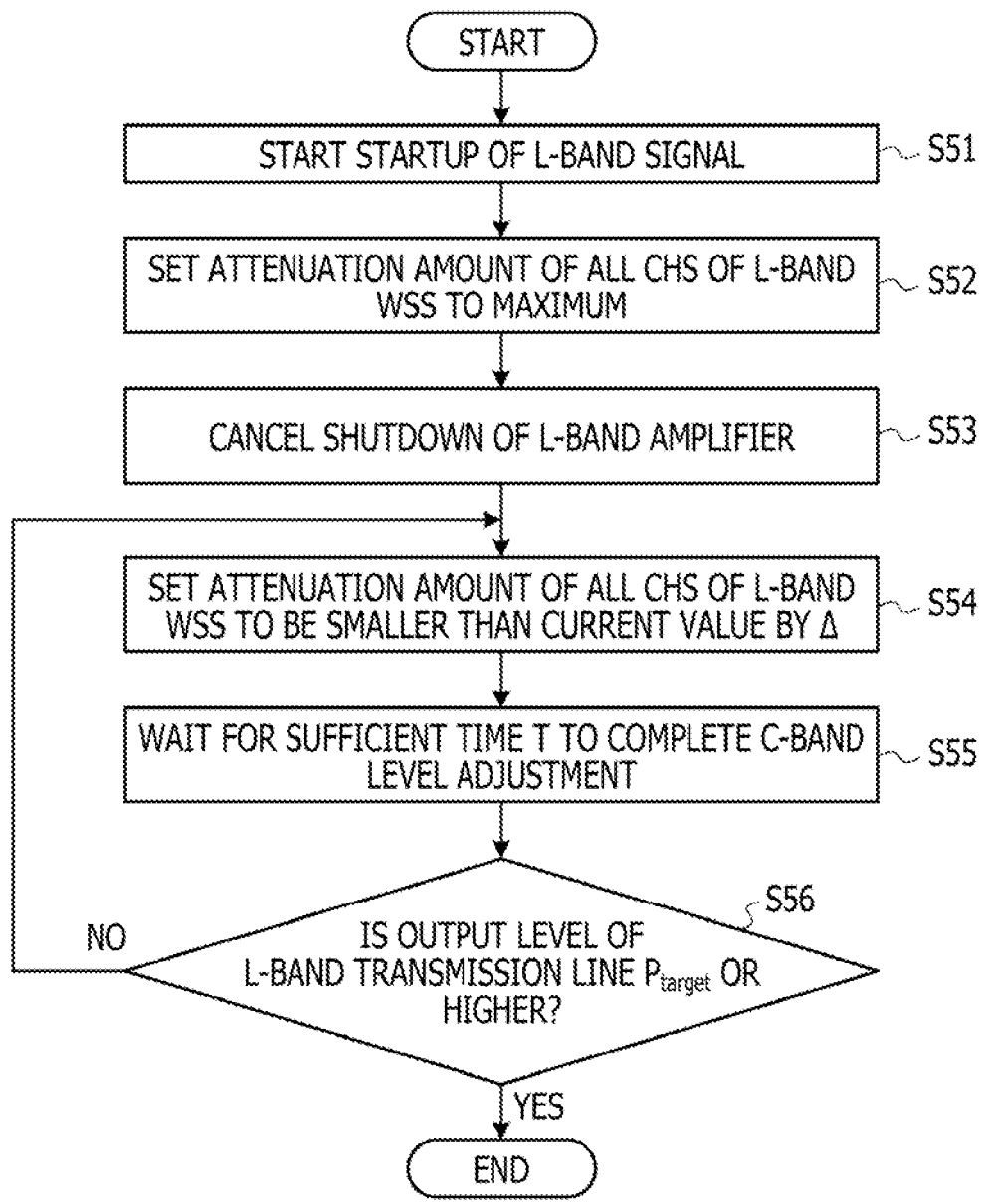
FIG. 9 is a flowchart of a modification of autonomous control at the time of L band addition.

FIG. 9 is a flowchart of a modification of autonomous control at the time of L band addition. In the modification, the WSS 121 of the selection unit 12 on the transmission side controls the attenuation amount for each channel instead of the control of the attenuation amount of the VOA 14. In general, the WSS has a port switch function to be connected to a different output port for each channel (wavelength) and a function to adjust the power level of transmitted light for each wavelength. The power may be adjusted for each wavelength by the WSS 121 at a stage before amplification. In this case, the controller 19 controls the attenuation amount for each channel of the WSS 121.

When having received an L-band startup instruction from the operator or the network management device, the controller 19 of the optical transmission device 10-L starts up the L-band signal (S51). First, the attenuation amount of the WSS 121 of the selection unit 12 of the optical transmission device 10-L is set to the maximum for all the channels (S52). Next, the shutdown of the optical amplifier 13 is canceled (S53), and the attenuation amounts of all the channels of the WSS 121 are set to be smaller than the current value by Δ (S54). Thereby, the L-band WDM signal is output to the optical transmission line 2 with the minimum power.

Next, the controller 19 waits for the time T that is sufficient to complete the level adjustment of the C-band WDM signal (S55), and determines whether the output level of the L-band WDM signal is equal to or higher than the target power level Ptarget (S56). In a case where the output level has not reached the target power level Ptarget (NO in S56), the controller 19 returns to S54, further reduces the attenuation amount of each channel of the WSS 121, and waits for the predetermined time T (S55). The controller 19 repeats S54 and S55 until the L-band WDM signal reaches the target power level Ptarget, and terminates the processing at the time of L band addition when the L-band WDM signal has reached the power level Ptarget (YES in S56).

Figure 10:
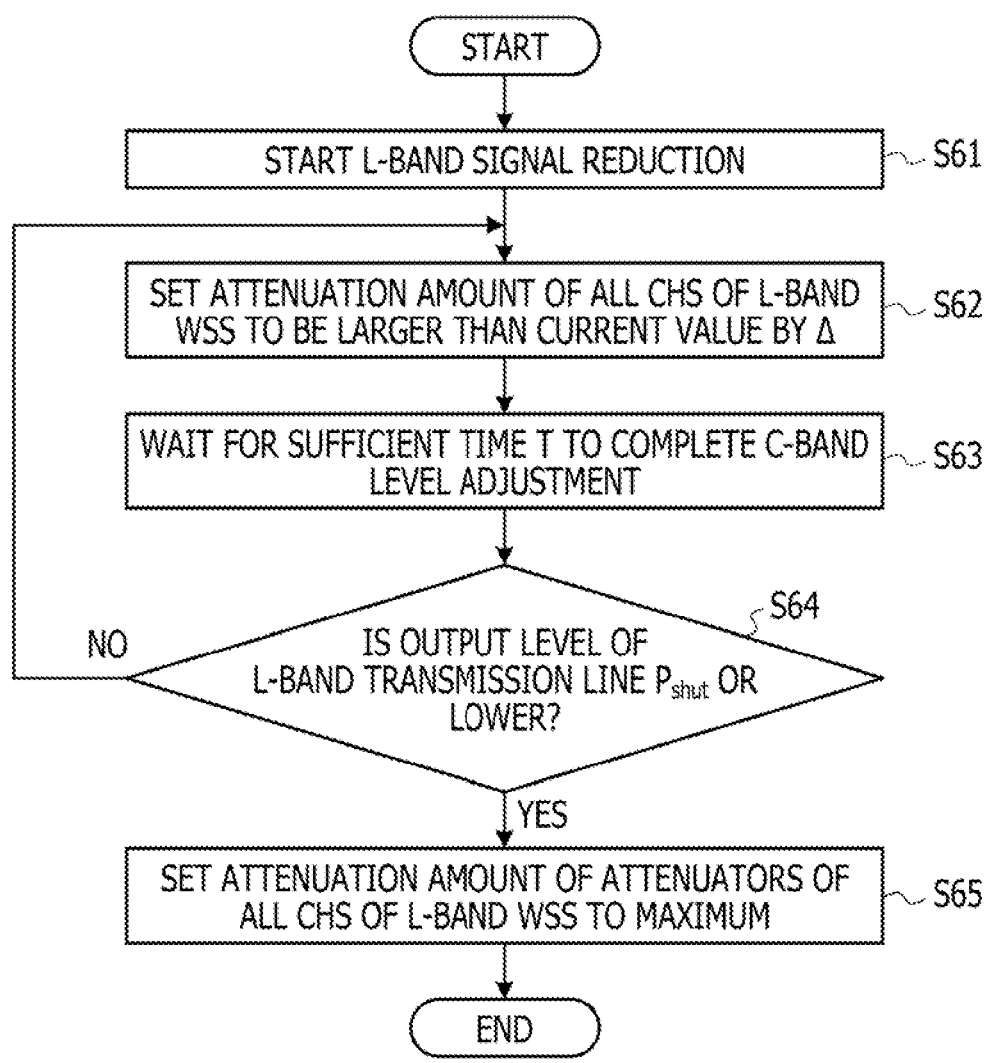
FIG. 10 is a flowchart of a modification of autonomous control at the time of L band reduction.

FIG. 10 is a flowchart of a modification of autonomous control at the time of L band reduction. When the controller 19 of the optical transmission device 10-L receives the instruction of the L band reduction from the operator or the network management device, the controller 19 starts the processing of the L band reduction (S61). The attenuation amounts of all the channels of the WSS 121 of the optical transmission device 10-L is set to be larger than the current value by Δ(S62). Thereby, the L-band WDM signal is output to the optical transmission line 2 with reduced power.

Next, the controller 19 waits for the time T that is sufficient to complete the level adjustment of the C-band WDM signal (S63), and determines whether the power level of the L-band WDM signal is equal to or lower than the shutdown level Pshut (S64). In the case where the power level has not reached the shutdown level Pshut (NO in S64), the controller 19 returns to S62 and further increases the attenuation amount of each channel of the WSS 121, and waits for the predetermined time T (S63). The controller 19 repeats S63 and S64 until the L-band WDM signal decreases to the shutdown level Pshut. When the output power of the L-band WDM signal has reached the shutdown level Pshut (YES in S64), the controller 19 sets the attenuation amount of all the channels of the WSS 121 to the maximum (S65) and terminates the processing at the time of L band reduction.

The control in FIGS. 5 to 10 is applied not only to the addition or reduction of the optical transmission of a specific wavelength band, but also to removal or reconnection of the optical transmission device (blade) of a specific wavelength band for maintenance or replacement. By more slowly controlling the power of the WDM signal of the added/reduced wavelength band than the convergence speed of the pre-emphasis control of other wavelength bands, the decrease or fluctuation in the level of the WDM signals of the other wavelength bands is suppressed. This enables in-service insertion and removal of the WDM signal in a new wavelength band.

The embodiments have been described on the basis of the specific configuration examples, but the present disclosure is not limited to the above-described configuration examples.

The description has been made focusing on the operation of the transmission side of the optical transmission device 10-L to be added or reduced, but similar control is performed by the processor 291 of the controller 29 on the transmission side of the opposite optical transmission device 20-L. The power control of the embodiment is not limited to the case of adding or removing the L-band WDM signal, and is applied to a case of newly inserting an S-band WDM signal on the shorter wavelength side than the C band during the operation of the C band and the L band, or a case of reducing the S band during the operation of the C band, the L band, and the S band.

In a case where a shared controller or individual processors 90 are used between the optical transmission devices 10-C and 10-L instead of the control processor 9, two types of time constants may be set for the controller or the processors. In a case of having a communication function between the optical transmission devices 10-C and 10-L, the optical transmission device 10-L may receive a notification of control convergence or stabilization of the C-band WDM signal from the optical transmission device 10-C.

For the power control at the time of addition or reduction, or maintenance or replacement, any attenuation function or power adjustment function provided in the optical transmission device may be used. For the branch of a channel to be dropped in the selection units 17 and 27 on the reception side of the optical transmission device, splitters, duplexers, or the like may be used instead of the WSSs 171 and 271.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission device comprising:
  a first wavelength selective switch for a first wavelength band with a shorter wavelength than a second wavelength band;
  a first wavelength selective switch controller configured to control an output power of the first wavelength selective switch;
  a first variable optical attenuator coupled to an output of the first wavelength selective switch and configured to control the output power of the first wavelength selective switch;
  a first variable optical attenuator controller configured to control the first variable optical attenuator;
  a second wavelength selective switch for the second wavelength band;
  a second wavelength selective switch controller configured to control an output power of the second wavelength selective switch;
  a second variable optical attenuator coupled to an output of the second wavelength selective switch and configured to control the output power of the second wavelength selective switch;
  a second variable optical attenuator controller configured to control the second variable optical attenuator; and a coupler configured to multiplex an output of the first variable optical attenuator and an output of the second variable optical attenuator, the first variable optical attenuator controller, when the first wavelength band is added to or removed from the optical transmission device, controls the first variable optical attenuator at a slower speed than a control speed of the second wavelength selective switch, and the second variable optical attenuator controller, when the second wavelength band is added to or removed from the optical transmission device, controls the second variable optical attenuator at a slower speed than a control speed of the first wavelength selective switch.

2. The optical transmission device according to claim 1, wherein the second variable optical attenuator controller more slowly changes an adjustment amount for each wavelength set in the adjustor than the control speed of the first wavelength selective switch when the second wavelength band is added or removed.

3. The optical transmission device according to claim 2, wherein the second variable optical attenuator controller changes a power adjustment amount of a wavelength-multiplexed signal in the second wavelength band, using a second time constant larger than a first time constant of a power control in the first wavelength band, when the second wavelength band is added or removed.

4. The optical transmission device according to claim 2, wherein the second variable optical attenuator controller changes a power adjustment amount of a wavelength-multiplexed signal in the second wavelength band, by receiving a convergence notification of the power control in the first wavelength band, when the second wavelength band is added or removed.

5. The optical transmission device according to claim 1, wherein, when the second wavelength band is added, the second variable optical attenuator controller transmits a wavelength-multiplexed signal in the second wavelength band to the optical transmission device at a first power level lower than a target power level, and increases the power level of the wavelength-multiplexed signal stepwise until the power level reaches the target power level.

6. The optical transmission device according to claim 1, wherein, when the second wavelength band is removed, the second variable optical attenuator controller transmits a wavelength-multiplexed signal in the second wavelength band to the optical transmission device at a second power level lower than a current power level, and reduces the power level of the wavelength-multiplexed signal stepwise until the power level reaches a predetermined shutdown level.

7. The optical transmission device according to claim 1, wherein the optical transmission device is a ROADM node connected to an optical network.

8. The optical transmission device according to claim 1, wherein the second wavelength band is a wavelength band on a longer wavelength side than the first wavelength band.

* * * * *